United States Patent
Chung et al.

(10) Patent No.: US 7,499,300 B2
(45) Date of Patent: Mar. 3, 2009

(54) SELF-DRIVEN SYNCHRONOUS RECTIFICATION AND VOLTAGE STABILIZATION CIRCUIT

(75) Inventors: Shin-Hong Chung, Guangdong (CN); Kuan-Hong Hsieh, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 302 days.

(21) Appl. No.: 11/309,471

(22) Filed: Aug. 10, 2006

(65) Prior Publication Data

US 2007/0076457 A1    Apr. 5, 2007

(30) Foreign Application Priority Data

Sep. 16, 2005    (CN) .................. 2005 1 0037362

(51) Int. Cl.
*H02M 5/42*    (2006.01)
(52) U.S. Cl. .................. 363/91; 363/93; 363/127; 363/130
(58) Field of Classification Search .................. 363/91, 363/93, 127, 130
See application file for complete search history.

(56) References Cited

U.S. PATENT DOCUMENTS

| | | | |
|---|---|---|---|
| 6,069,799 A | 5/2000 | Bowman et al. | |
| 6,301,139 B1 | 10/2001 | Patel | |
| 6,462,965 B1 | 10/2002 | Uesono | |
| 6,785,151 B2* | 8/2004 | Ingman et al. | ............... 363/91 |
| 2002/0044470 A1 | 4/2002 | Guichao | |

* cited by examiner

*Primary Examiner*—Shawn Riley
(74) *Attorney, Agent, or Firm*—Winston Hsu

(57) ABSTRACT

A synchronous rectification and voltage stabilization circuit includes a saturable inductance coil (L1), a synchronous rectifier switch (33), a driving coil (L2) for turning on the synchronous rectifier switch, a discharging coil (L3) which co-operates with a controllable switching component (Q1) to turn off the synchronous rectifier switch, a filter circuit (40) and a voltage stabilization circuit (50). The saturable inductance coil, the synchronous rectifier switch and the filter circuit are connected in serial between an input terminal (10) and an output terminal (20). The saturable inductance coil is coiled together with the driving coil and the discharging coil on one core. The voltage stabilization circuit is connected between the output terminal and the saturable inductance coil, and is used for regulating a regulable saturation point of the saturable inductance coil according to an output voltage of the output terminal and a target value of the output voltage.

8 Claims, 2 Drawing Sheets

SELF-DRIVEN SYNCHRONOUS RECTIFICATION AND VOLTAGE STABILIZATION CIRCUIT

1. TECHNICAL FIELD

The present invention relates to synchronous circuits, and particularly to a self-driven synchronous rectification and voltage stabilization circuit.

2. RELATED ART

There is an ever-increasing demand in the power electronics market for low voltage and high current DC-DC converters. As an output voltage is desired to be 3.3V or lower, even with a state-of-the art Schottky diode with a forward voltage drop of 0.3V has an unacceptable amount of power loss.

Because of this, synchronous rectifiers are often used to improve the efficiency of DC-DC converters. Generally, there are two types of synchronous rectifiers, self-driven and externally driven. Since the self-driven mode is usually less complex, less costly, and more reliable, it is a preferred choice for use with most low voltage DC-DC converter applications.

In a conventional self-driven synchronous rectification DC-DC converter, in order to regulate an output voltage thereof, a Pulse Wave Modulation (PWM) control circuit is typically employed. The PWM control circuit outputs PWM waves according to a feedback from the output voltage. The PWM waves switch a power switch connected with a primary winding of a transformer on and off, thus regulating the output voltage. However, in such a regulation mode, for down-stream components of the PWM control circuit such as the transformer are uncontrollable, the output voltage cannot be exactly regulated to its target value.

In addition, in the conventional self-driven synchronous rectification circuit, a secondary winding of a main transformer is employed to directly turn on a synchronous rectifier switch, while a discharging circuit is employed to quickly turn off the synchronous rectifier switch. The discharging circuit typically includes a discharging coil that produces an inducted voltage thereaccross according to a current change occurred in the main transformer or another transformer. However, the discharging coil is usually coiled on a core different from the main transformer core. This not only brings down the input/output ratio, but also increases a size of the self-driven synchronous rectification circuit.

Therefore, there is a need for providing a synchronous rectification and voltage stabilization circuit which can solve the above-mentioned problems.

SUMMARY

A synchronous rectification and voltage stabilization circuit is provided in accordance with a preferred embodiment. The synchronous rectification and voltage stabilization circuit includes a synchronous rectification circuit and a filter circuit connected. The synchronous rectification circuit further includes a synchronous rectifier switch, a driving circuit comprising a driving coil for turning on the synchronous rectifier switch, and a discharging circuit comprising a discharging coil and a controllable switching component for co-operating to turn off the synchronous rectifier switch. The synchronous rectification circuit is connected in serial with the filter circuit between an input terminal and an output terminal. The synchronous rectification and voltage stabilization circuit further includes a saturable inductor and a voltage stabilization circuit. The saturable inductor is connected between the input terminal and the synchronous rectifier switch and includes a saturable inductance coil. The saturable inductance coil is coiled together with the driving coil and the discharging coil on one core, and has a regulable saturation point. The voltage stabilization circuit is connected between the output terminal and the saturable inductance coil, and is used for regulating the regulable saturation point of the saturable inductance coil according to an output voltage of the output terminal and a target value of the output voltage.

Other advantages and novel features will be drawn from the following detailed description with reference to the attached drawings, in which:

DETAILED DESCRIPTION OF THE EMBODIMENTS

Figure 1:
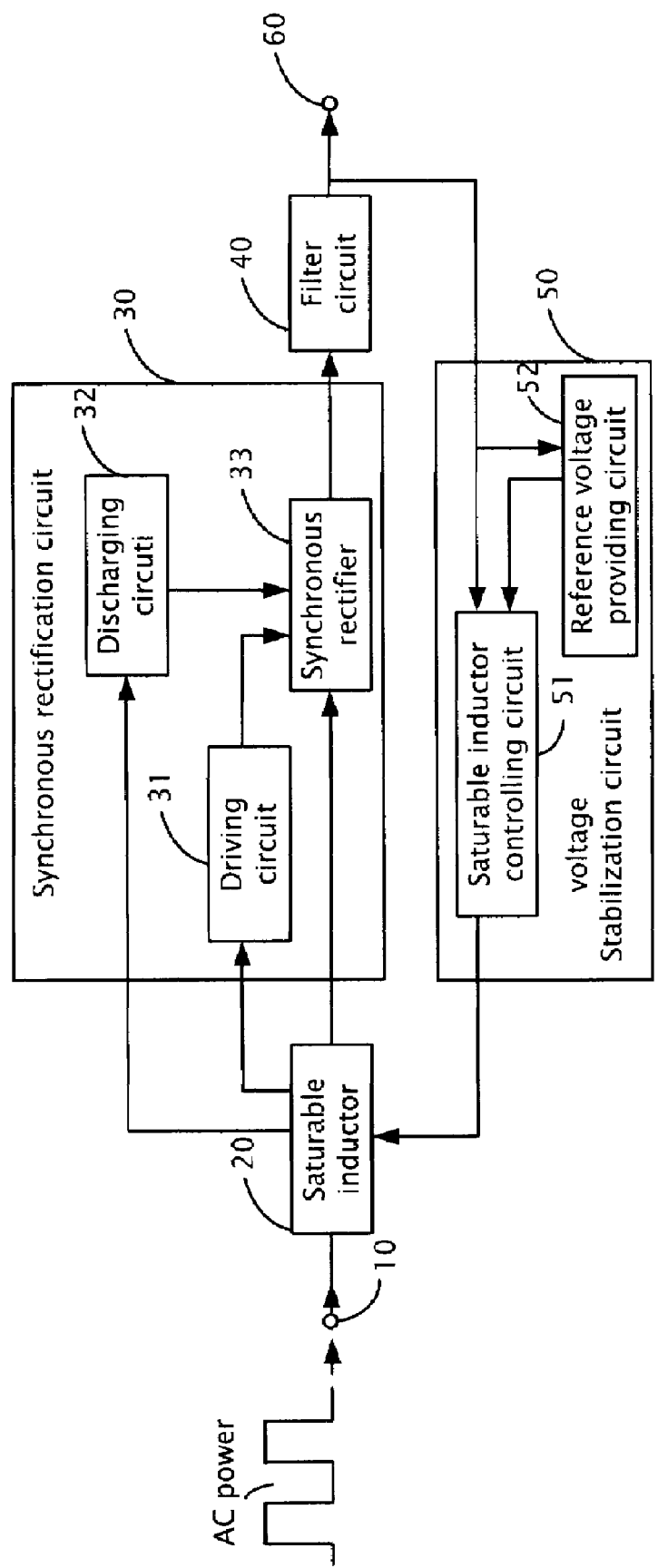
FIG. 1 depicts an exemplary block diagram of a self-driven synchronous rectification and voltage stabilization circuit in accordance with a preferred embodiment of the present invention.

Referring to FIG. 1, a block diagram of a self-driven synchronous rectification and voltage stabilization circuit mainly includes a saturable inductor 20, a synchronous rectification circuit 30, a filter circuit 40, and a voltage stabilization circuit 50. The saturable inductor 20, the synchronous rectification circuit 30 and the filter circuit 40 are sequentially connected in serial between an input terminal 10 and an output terminal 60. The saturable inductor 20 receives an AC power from an AC power source (not shown) via the input terminal 10 and forwards the AC power to the synchronous rectification circuit 30. The synchronous rectification circuit 30 and the filter circuit 40 co-operate and convert the AC power to a DC power and then outputs the DC power to the output terminal 60. The AC power may be a unidirectional rectangular wave power. The unidirectional rectangle wave power may be resulted from a secondary DC power after being switched on and off by a power switch. The voltage stabilization circuit 50 is connected between the output terminal 60 and the saturable inductor 20. The voltage stabilization circuit 50 regulates a regulable saturation point of the saturable inductor 20 according to an output voltage of the output terminal 60, thus regulating the output voltage to a target value.

The synchronous rectification circuit 30 mainly includes a synchronous rectifier switch 33, a driving circuit 31 and a discharging circuit 32. The synchronous rectifier switch 33 is connected between the saturable inductor 20 and the filer circuit 40. The driving circuit 31 and the discharging circuit 32 are connected in parallel between the saturable inductor 20 and a gate of the synchronous rectifier switch 33. The driving circuit 31 accumulates charges on the gate of the synchronous rectifier switch 33, thus switching on the synchronous rectifier switch 33. The discharging circuit 32 acts contrary to the driving circuit 31; the discharging circuit 32 removes the charges that the driving circuit 31 accumulates from the gate of the synchronous rectifier switch 33, thus switching off the synchronous rectifier switch 33.

The voltage stabilization circuit 50 mainly includes a saturable inductor controlling circuit 51 and a reference voltage providing circuit 52. The reference voltage providing circuit 52 is used to produce a reference voltage for the saturable inductor controlling circuit 51. In one embodiment as shown in the FIG. 1, the reference voltage providing circuit 52 produces the reference voltage according to the output voltage of the output terminal 60.

However, in an alternative embodiment, the reference voltage providing circuit 52 is disconnected from the output terminal 60, allowing the reference voltage providing circuit 52 to be controlled by other components to produce the reference voltage, or to produce the reference voltage at a constant value that corresponds to the target value of the output voltage independent of other components. The saturable inductor controlling circuit 51 is connected between the output terminal 60 and the saturable inductor 20. The saturable inductor 20 receives the reference voltage from the reference voltage providing circuit 52 and regulates the regulable saturation point of the saturable inductor 20 according to the reference voltage.

Figure 2:
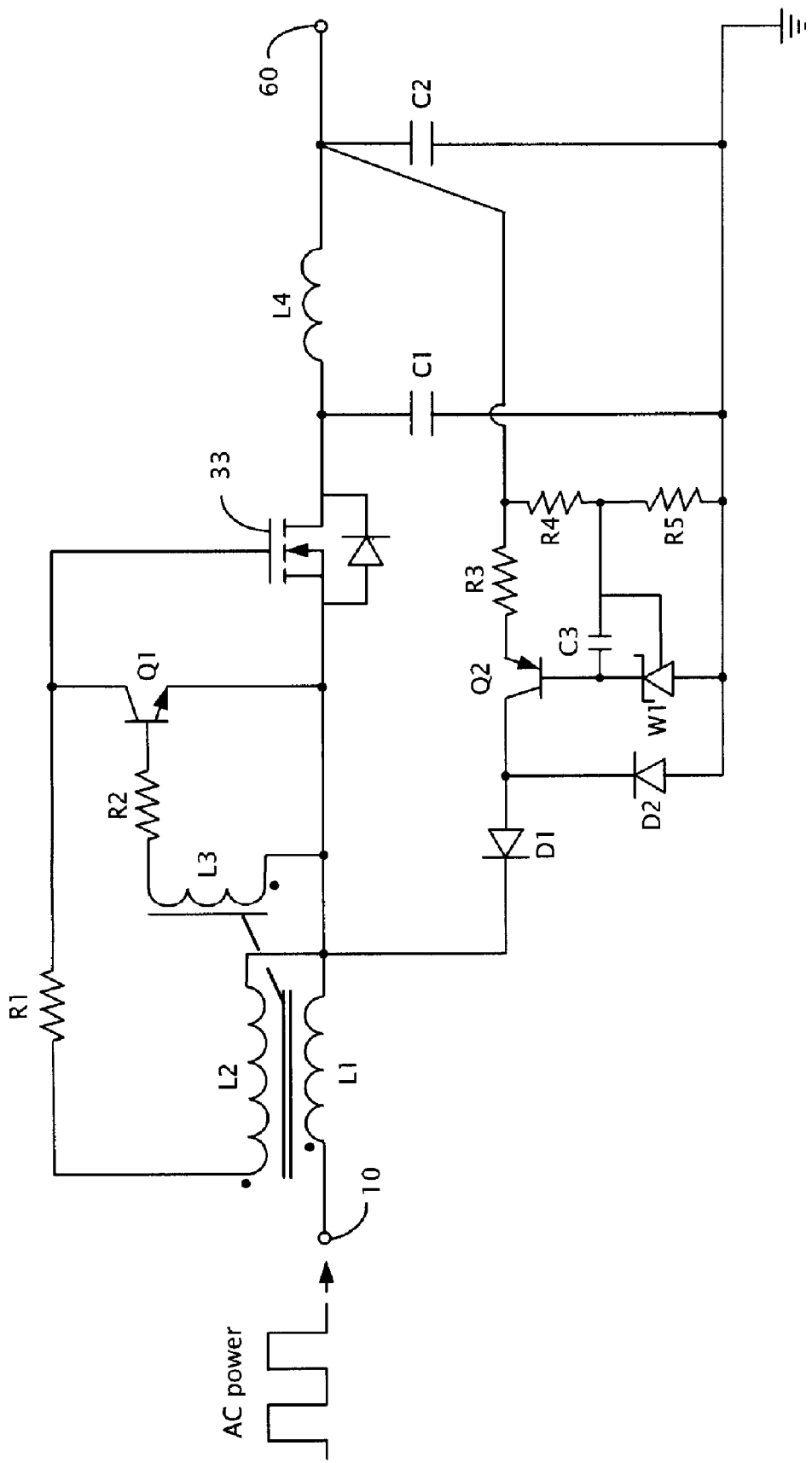
FIG. 2 depicts a circuit diagram of the self-driven synchronous rectification and voltage stabilization circuit of FIG. 1.

Referring to FIG. 2. The saturable inductor 20 includes a saturable inductance coil L1. The driving circuit 31 includes a driving coil L2, while the discharging circuit 32 includes a discharging controlling coil L3 and a controllable switching component; for example, a switching NPN transistor Q1. The saturable inductance coil L1, the driving coil L2, and the discharging circuit 32 are coiled round a core.

A dotted terminal of the saturable inductance coil L1 is connected to the input terminal 10 and an undotted terminal of the saturable inductance coil L1 is connected to the synchronous rectifier switch 33. A dotted terminal of the driving coil L2 is connected to the gate of the synchronous rectifier switch 33 via a resistance component (e.g., a resistor R1), and an undotted terminal of the driving coil L2 is connected to the undotted terminal of the saturable inductance coil L1. A dotted terminal of the discharging controlling coil L3 is connected to the dotted terminal of the saturable inductance coil L1, and an undotted terminal of the discharging controlling coil L3 is connected to a base of the switch NPN transistor Q1 via a resistance component (e.g., a resistor R2). The switch NPN transistor Q1 is connected with the gate of the synchronous rectifier switch 33 at a collector thereof, and connected with the undotted terminal of the saturable inductance coil L1 at an emitter thereof.

A change of a current through the saturable inductance coil L1 results in corresponding changes of voltages across the driving coil L2 and the discharging controlling coil L3. When the current through the saturable inductance coil L1 changes from a low level to a high level, an inducted voltage (hereinafter "the inducted voltage I") is produced across the driving coil L2. The inducted voltage I accumulates charges on the gate of the synchronous rectifier switch 33 and therefore turns on the synchronous rectifier switch 33. When the current through the saturable inductance coil L1 changes from the high level to the low level, an inducted voltage (hereinafter "the inducted voltage II") is produced across the discharging controlling coil L3, The inducted voltage II turns on the switching NPN transistor Q1, thus to move the charges from the gate of the synchronous rectifier switch 33. The synchronous rectifier switch 33 is therefore turned off.

The filter circuit 40 shown in is a pi low pass filter constituted by two capacitors C1 and C2, and an inductor L4. The inductor L4 is connected between the synchronous rectifier switch 33 and the output terminal 60. The capacitors C1 and C2 are interposed on each side of the inductor L4. Each of the capacitors C1 and C2 has two terminals, of which one is connected with the inductor L4 and another is connected with the ground potential. The filter circuit 40 may alternatively employ other types of filters, such as an L-type low pass filter.

The saturable inductor controlling circuit 51 mainly includes a voltage stabilizer W1 and a controllable switching unit. The voltage stabilizer W1 is used to keep a steady voltage (e.g., a zener voltage) thereacross. The steady voltage corresponds to the target value of the output voltage. In FIG. 2, the voltage stabilizer W1 is shown as a controllable three-terminal voltage stabilizer including a controlling terminal and two conducting terminals. One of the conducting terminals is connected with the controllable switching component, and another of the conducting terminals is connected with the ground potential. Currents are controlled by the controlling terminal to flow through the conducting terminals.

The controllable switching unit is shown in FIG. 2 as a switching PNP transistor Q2 having a base, a collector, and an emitter. The base of the switching PNP transistor Q2 is connected with one conducting terminal of the controllable three-terminal voltage stabilizer W1. The collector of the switching PNP transistor Q2 is connected with the output terminal 60 via a resistance component, such as a resistor R3 shown in Fig. 2. The emitter of the switching PNP transistor Q2 is connected with the undotted terminal of the saturable inductance coil L1 via a diode D1. The diode D1 permits currents to flow from the switching PNP transistor Q2 to the saturable inductance coil L1 and thus to regulate the regulable saturation point of the saturable inductance coil L1. Further, a diode D2 is connected between the emitter of the switching PNP transistor Q2 and the ground potential.

The reference providing circuit 52 shown in FIG. 2 is a voltage dividing circuit. The voltage dividing circuit is connected between the output terminal 60 and the ground potential and includes two serial-connected resistors R4 and R5. The resistors R4 and R5 forms a node A therebetween, and the node A is connected to the base of the switching PNP transistor Q2 via a capacitor C3, and to the controlling terminal of the controllable three-terminal voltage stabilizer W1.

The voltage dividing circuit and the controllable three-terminal voltage stabilizer co-operate to turn on the switching PNP transistor Q1, thus to feed back a suitable amount of current to the saturable inductor 20. In this embodiment, the suitable amount of current is determined by the voltage dividing circuit and the controllable three-terminal voltage stabilizer W1 according to the output voltage and the target value of the output voltage.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A synchronous rectification and voltage stabilization circuit, comprising:
    an input terminal;
    an output terminal;
    a synchronous rectifier switch having a gate;
    a driving circuit comprising a driving coil connected with the gate of the synchronous rectifier switch, configured for tuning on the synchronous rectifier switch according to voltages inducted across the driving coil;
    a discharging circuit comprising a discharging coil and a controllable switching component both connected to the gate of the synchronous rectifier switch, configured for turning off the synchronous rectifier switch according to voltages inducted across the discharging coil;
    a saturable inductor comprising a saturable inductance coil connected between the input terminal and the synchronous rectifier switch, the saturable inductor having a regulable saturation point; and a voltage stabilization circuit connected between the output terminal and the saturable inductor, configured for regulating the regulable saturation point of the saturable inductor according to an output voltage of the output terminal and a target value of the output voltage.

2. The circuit as claimed in claim 1, wherein the saturable inductance coil, the driving coil and the discharging coil are coiled round one core.

3. The circuit as claimed in claim 2, wherein a change of a current through the saturable synchronous coil from a low level to a high level produces an inducted voltage across the driving coil, and the inducted voltage turns on the synchronous rectifier switch.

4. The circuit as claimed in claim 2, wherein a change of the current through the saturable synchronous coil from the high level to the low level produces an inducted voltage across the discharging coil, and the inducted voltage controls the controllable switching component to conduct and therefore turns off the synchronous rectifier switch.

5. The circuit as claimed in claim 2, wherein the saturable inductance coil, the driving coil and the discharging coil each has a dotted terminal and an undotted terminal, the saturable inductance coil is connected with the input terminal at the dotted terminal thereof, and connected with the synchronous rectifier switch at the undotted terminal thereof, the driving coil is connected with the gate of the synchronous rectifier switch at the dotted terminal thereof, and connected with the undotted terminal of the saturable inductance coil at the undotted terminal thereof, and the discharging coil is connected with the undotted terminal of the saturable inductance coil at the dotted terminal thereof, and connected with the controllable switching component at the undotted terminal.

6. The circuit as claimed in claim 1, wherein the voltage stabilization circuit comprises a saturable inductor controlling circuit and a reference voltage providing circuit, the reference voltage producing circuit provides a reference voltage according to the output voltage and the target value of the output voltage, and the saturable inductor controlling circuit feeding back a suitable amount of current to the saturable inductor according to the output voltage and the target value of the output voltage.

7. The circuit as claimed in claim 1, wherein the voltage stabilization circuit comprises a saturable inductor controlling circuit and a reference voltage providing circuit, the reference voltage producing circuit provides a reference voltage according to a target value of the output voltage, and the saturable inductor controlling circuit feeding back a suitable amount of current to the saturable inductor according to the target value of the output voltage.

8. The circuit as claimed in claim 1, wherein the controllable switching component is a switching NPN transistor.

* * * * *